United States Patent
Brenner

(10) Patent No.: US 8,573,134 B2
(45) Date of Patent: Nov. 5, 2013

(54) TRANSPARENT SHELF GUARD

(76) Inventor: Michael Brenner, Coral Springs, FL (US)

( * ) Notice: Subject to any disclaimer, the term of this patent is extended or adjusted under 35 U.S.C. 154(b) by 0 days.

(21) Appl. No.: 13/207,082

(22) Filed: Aug. 10, 2011

(65) Prior Publication Data

US 2012/0037048 A1 Feb. 16, 2012

Related U.S. Application Data

(60) Provisional application No. 61/401,236, filed on Aug. 10, 2010.

(51) Int. Cl.
*A47B 17/00* (2006.01)

(52) U.S. Cl.
USPC .............................................. 108/27; 126/42

(58) Field of Classification Search
USPC .............. 108/27; 211/184; 126/42, 22, 214 D
See application file for complete search history.

(56) References Cited

U.S. PATENT DOCUMENTS

| | | | | |
|---|---|---|---|---|
| 2,088,077 A | * | 7/1937 | Wood | 108/27 |
| 2,942,924 A | * | 6/1960 | Stangert | 108/27 |
| 3,912,085 A | * | 10/1975 | Cooke et al. | 108/27 |
| 4,157,705 A | * | 6/1979 | Caan | 126/214 D |
| 4,942,968 A | * | 7/1990 | Fast | 211/184 |
| 5,076,255 A | * | 12/1991 | Harrison | 126/42 |
| 5,208,084 A | * | 5/1993 | Rutz | 108/27 |
| 5,436,048 A | * | 7/1995 | Meier et al. | 108/27 |
| 5,450,840 A | * | 9/1995 | Kozdas | 126/42 |
| 5,496,609 A | * | 3/1996 | Michelstein | 108/27 |
| 5,546,928 A | * | 8/1996 | Lewis et al. | 126/214 D |
| 5,655,670 A | * | 8/1997 | Stuart | 211/43 |
| 5,758,636 A | * | 6/1998 | Butrimas et al. | 126/42 |
| 5,813,396 A | * | 9/1998 | Bessette | 126/214 D |
| 5,842,464 A | * | 12/1998 | Koch | 126/42 |
| 6,299,004 B1 | * | 10/2001 | Thalenfeld et al. | 211/184 |
| 6,571,498 B1 | * | 6/2003 | Cyrluk | 108/27 |
| 6,871,923 B2 | * | 3/2005 | Dietz et al. | 108/27 |
| 7,140,499 B2 | * | 11/2006 | Burke | 211/184 |
| 7,549,417 B2 | * | 6/2009 | Dang | 126/42 |
| 2008/0283032 A1 | * | 11/2008 | Dang | 126/42 |

* cited by examiner

*Primary Examiner* — Jose V Chen
(74) *Attorney, Agent, or Firm* — Robert M. Downey, P.A.

(57) ABSTRACT

A shelf guard 20 comprises at least one protective member 22 having at least an inner-facing (i.e. towards a support structure 40) surface 23 and at least one mounting member 24 having at least an inner-facing surface 27 that are preferably both made from a transparent and substantially rigid material, such as plastic or acrylic. An attachment element 30 (such as an adhesive strip or double sided tape) is included on the inner-facing surface 27 of at least one mounting member 24 to secure the shelf guard 20 to a shelf 40 by adhering to the shelf's underside surface 44 with the inner-facing surface 23 of the at least one protective member 22 extending upwardly from the edge of the support structure 40 to define an upwardly extending protective wall along the edge, thereby preventing objects stored on a surface of the support structure 40 from falling off the edge of the support structure 40. The attachment element 30 is preferably an adhesive having a peel-away protective film 32 that is removed immediately prior to installation.

3 Claims, 5 Drawing Sheets

TRANSPARENT SHELF GUARD

BACKGROUND OF THE INVENTION

This non-provisional patent application is based on provisional patent application Ser. No. 61/401,236 filed on Aug. 10, 2010.

1. Field of the Invention

The present invention relates to attachable barriers which prevent objects from falling off edges of surfaces.

2. Discussion of the Related Art

Items are often stored on flat surfaces near edges (e.g. on shelves or tables). Unfortunately, such items often fall off of these edges when these surfaces are too small and/or when they have too many items placed upon them. It is well known that this will then often lead to the falling item either breaking or spilling its contents. Expensive and/or hard to replace items may fall and break, or a container of pills may spill onto the floor, all of which can be very frustrating, especially after repeated incidents. Even on surfaces which are properly sized and are storing the correct amount of items, accidents often cause items to be knocked off of an edge. This is particularly common for many types of shelves such as those in medicine cabinets, grocery stores, and garages because these shelves are often crowded with objects, are relatively small, and have no barriers on the edge.

Some shelves (particularly refrigerator shelves) are currently manufactured with a front lip built into their structure and therefore provide some protection against items falling off the front edge of the shelf. However, existing devices and methods for retro-fitting a shelf guard to a previously unguarded shelf are inconvenient, expensive and impractical. There is no current method for attaching inexpensive and effective shelf guards to existing shelves that have open, unguarded edges. Therefore, there remains a need for a cheap-to-manufacture, easy-to-produce, highly effective, and aesthetically appealing shelf guard that is readily adapted to be conveniently and easily attached to any existing shelf or other edge of a surface in order to prevent items stored on the shelf from falling down.

BRIEF SUMMARY OF THE INVENTION

The present invention is directed to a shelf guard manufactured from a strong, substantially rigid transparent material, such as plastic or acrylic. The shelf guard includes at least one protective member and at least one mounting member, each having an inner facing surface (facing towards the shelf) and an outer facing surface (facing away from the shelf). The inner facing surface of the protective member is hereinafter defined as the protective surface, and the inner facing surface of the mounting member is hereinafter defined as the mounting surface. An attachment element is included on at least one mounting surface for attaching to a surface adjacent to an edge (e.g. the underside of a shelf). The attachment element may be a double sided tape, an adhesive pad, or any other conventional means of adhering two surfaces together.

In one preferred embodiment of the present invention, the attachment element includes an adhesive with an inner facing adhesive surface, wherein the shelf guard is attached to a shelf by peeling away a protective film from the inner facing adhesive surface of the adhesive of the attachment element and then moving the shelf guard toward the shelf until the front edge of the shelf makes direct contact with the protective surface of the protective member of the shelf guard. Next, the shelf guard is moved upwards until the underside of the shelf makes direct contact with the inner facing adhesive surface of the adhesive of the attachment element on the adhering surface of the mounting member. Pressure should be applied at this point to ensure that the attachment element securely bonds to the underside surface of the shelf.

The shelf guard may be manufactured in any number of sizes, shapes, designs and proportions to meet the consumers' needs. Any existing edge of a surface may be fitted with the shelf guard. The shelf guard may be manufactured in any of a variety of colors and/or include any number of indicia to increase its aesthetic appeal and to match it with the surface that it attaches to. The shelf guards may preferably be manufactured in mass quantities to reduce production costs per unit in order to allow consumers to purchase shelf guards for very affordable prices. Replacement adhesives may be sold separately so that functioning shelf guards with worn out adhesives may be reused.

Statement of The Objects and Advantages of the Invention

Considering the foregoing, it is a primary object of the present invention to provide a shelf guard that may be attached to any existing surface with an edge in order to protect any and all items stored on the surface from falling off the edge.

It is still another object of present invention to provide a shelf guard, as described above, that is transparent.

It is still another object of the present invention to provide a shelf guard, as described above, that may be easily attached and detached from a shelf using any conventional attachment element, preferably an easy-to-use included adhesive strip further preferably having a peelable protective film.

It is still another object of the present invention to provide a shelf guard, as described above, that may be manufactured in any practical size, shape and design to meet the consumers' needs.

It is still another object of the present invention to provide a shelf guard, as described above, that may be used on any existing, unguarded surface edges.

It is still another object of the present invention to provide a shelf guard, as described above, that is inexpensive and easy to produce in mass quantities.

It is still another object of the present invention to provide a shelf guard, as described above, that may be sold to consumers at a very affordable price.

It is still another object of the present invention to provide a shelf guard, as described above, that may be manufactured in any color or variety of colors and may include any desired indicia on its outer face.

It is still another object of the present invention to provide a shelf guard, as described above, that may be adapted to be secured to a variety of types of edges, including but not limited to right-angle corners, rounded corners, rounded edges such as those found on circular tables, and traditional straight edges.

These and other objects and advantages of the present invention are more readily apparent with reference to the detailed description and accompanying drawings.

BRIEF DESCRIPTION OF THE SEVERAL VIEWS OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE INVENTION

Figure 1:
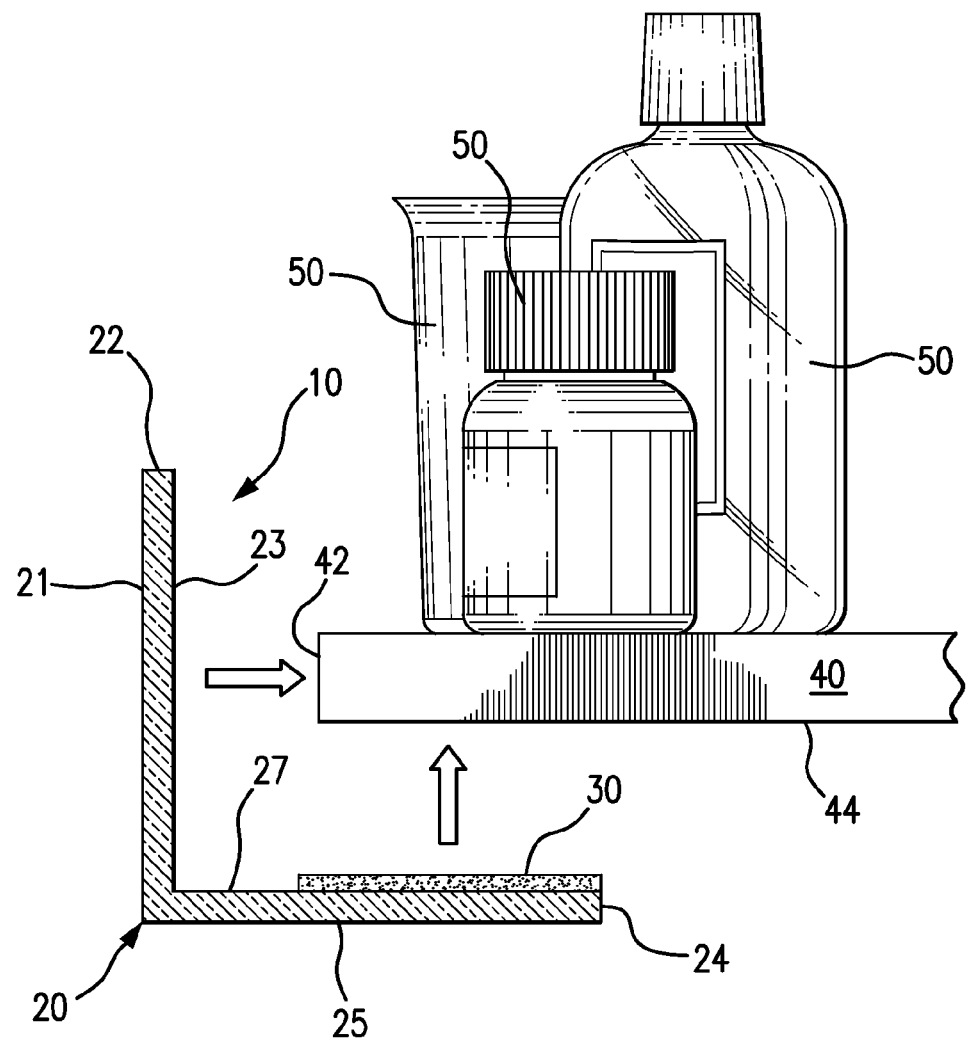
FIG. 1 is a schematic side elevational view in partial cross-section showing the shelf guard of the present invention in accordance with a first preferred embodiment, wherein the protective member and mounting member are shown in cross-section and wherein the mounting surface of the mounting member supports an attachment element for adhering to an underside of a shelf, wherein white arrows extending outwardly from the protective surface and the mounting surface designate the preferred method of attachment to a shelf.
Figure 2:
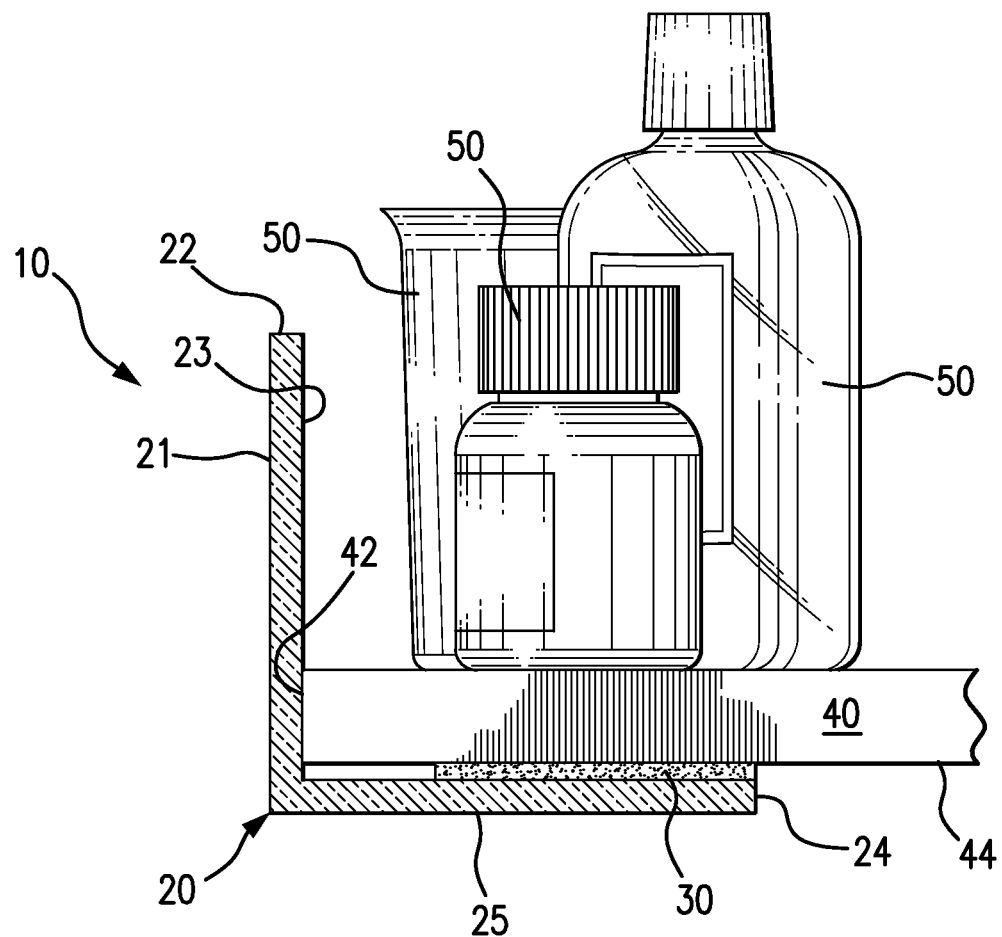
FIG. 2 is a schematic side elevational view in partial cross-section of the shelf guard of the embodiment of FIG. 1, and wherein the shelf guard has been attached to a shelf using the preferred method of attachment as illustrated in FIG. 1.
Figure 3:
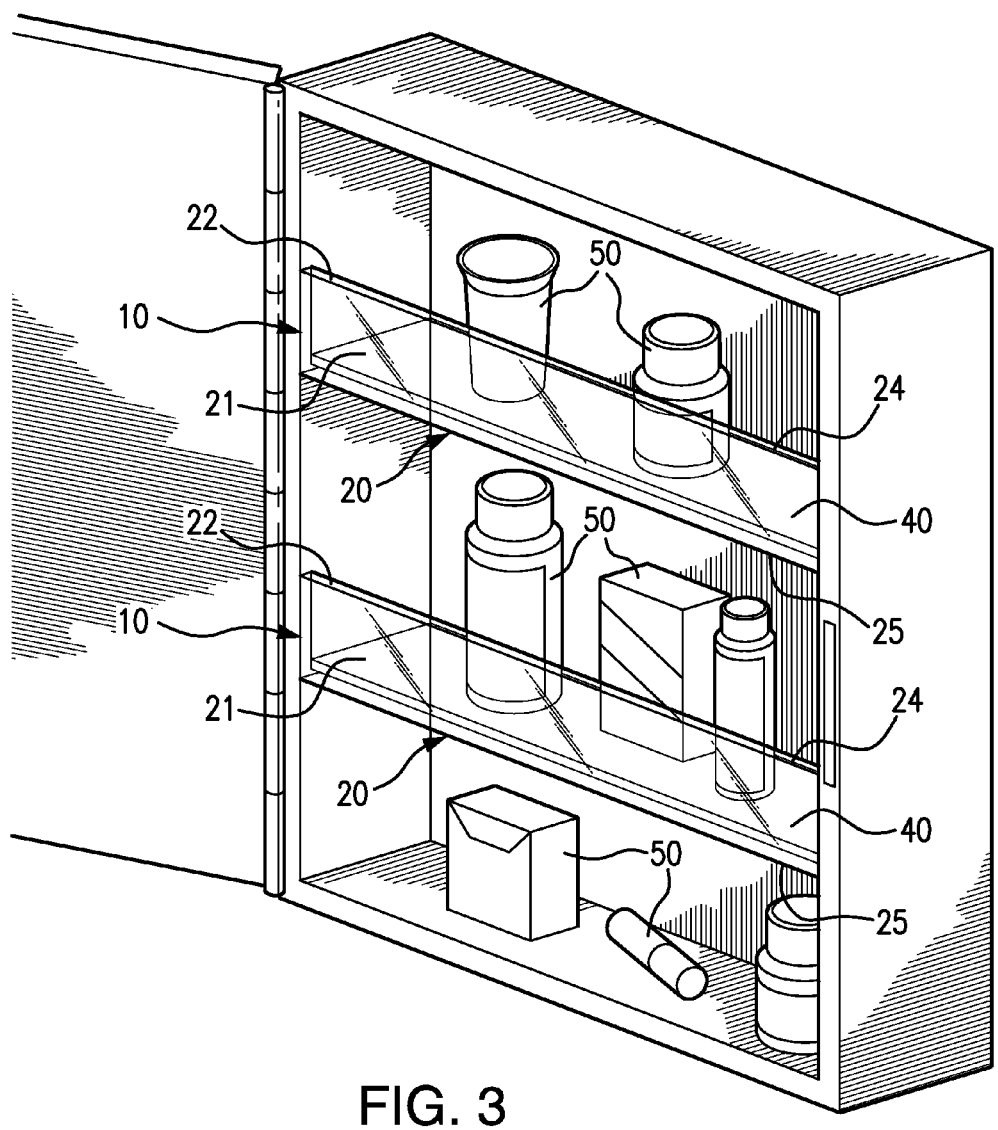
FIG. 3 is a schematic front perspective view of multiple shelf guards, of the embodiment of FIGS. 1 and 2, and wherein the shelf guards have been shown attached to medicine cabinet shelves in order to prevent objects from falling from the medicine cabinet shelves.

Referring to the several views of the drawings, the present invention is shown in accordance with several preferred embodiments. In each of these embodiments, the present invention is shown and is generally indicated as 10. FIGS. 1-3 show the present invention 10 in accordance with a first preferred embodiment, wherein a shelf guard 20 comprises at least one protective member 22 and at least one mounting member 24. The protective member 22 includes an outer facing surface 21 ("outer" hereinafter defined as meaning away from a support structure 40) and an inner facing surface ("inner" hereinafter defined as meaning towards a support structure 40) hereinafter defined as the protective surface 23. The protective surface 23 extends upwardly from the edge of the support structure 40 to define an upwardly extending protective wall along the edge of the support structure 40 through which objects 50 are unable to pass. The mounting member 24 comprises an outer facing surface 25 and an inner facing surface hereinafter defined as the mounting surface 27.

In the several embodiments illustrated in the several views of the drawings, the protective member 22 and mounting member 24 are shown perpendicular to each other. However, it is noted that this particular configuration, while suitable for most shelves such as medicine cabinet shelves (shown in FIG. 3), is not the full extent of the present invention 10. The protective member 22 and mounting member 24 may be oriented at any desired angle from each other (i.e. parallel at 180 degrees, or a 60 degree angle, etc.) in order to meet the needs of the shelf or other edge being protected.

Figure 4:
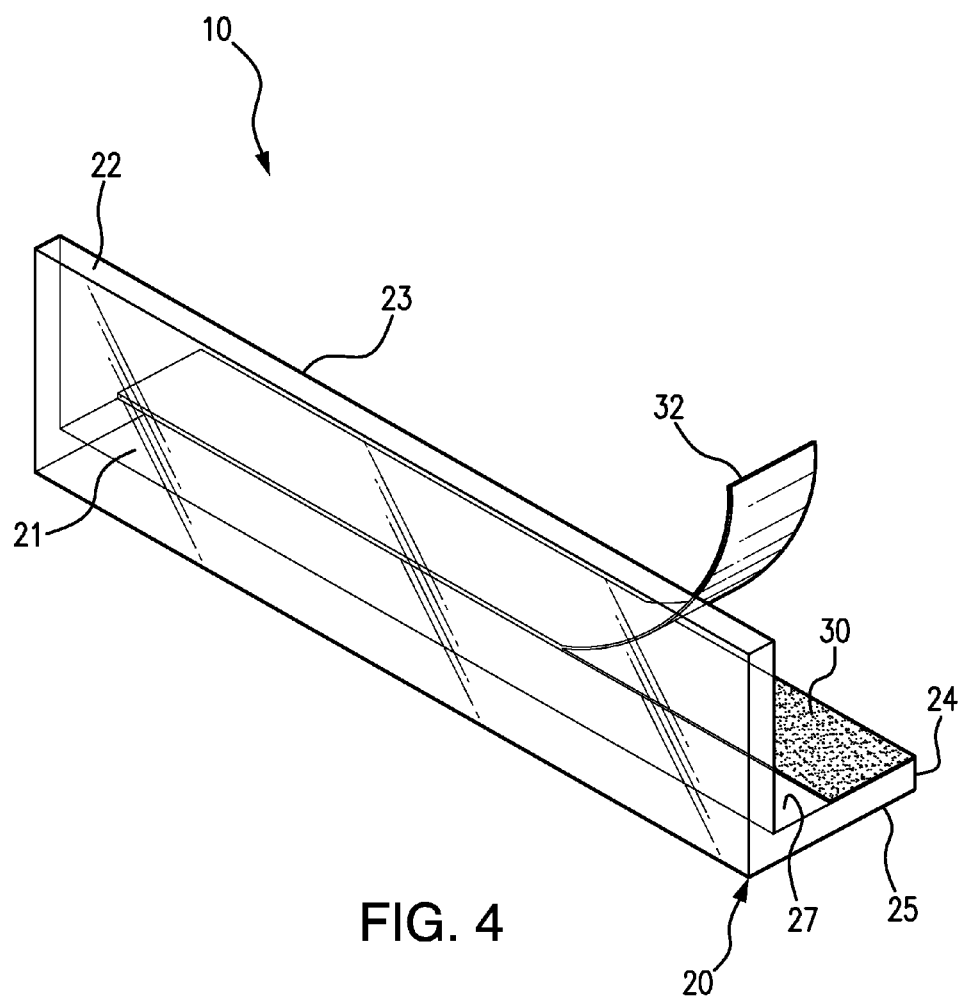
FIG. 4 is a schematic front perspective view showing the shelf guard of the present invention in accordance with a second embodiment of the invention, wherein the attachment element is shown as an adhesive pad or a double sided tape having a peelable protective film that is shown being removed immediately prior to installation of the shelf guard.

An attachment element 30 is included on the mounting surface 27 of the mounting member 24. Attachment element 30 may be a double sided tape, a plurality of adhesive pads, an adhesive strip, or any other conventional means of adhering together two surfaces. The attachment element 30 may, in accordance with a second embodiment, and as shown in FIG. 4, include an adhesive with an inner facing adhesive surface, whereon a peel-away protective film 32 covers the adhesive and is removed to expose the adhesive at the time of installation. Alternate embodiments may potentially include various forms of attachment element 30 that instead do not require a peel-away protective film 32, which is fully expected within the spirit and scope of the present invention.

In the first preferred embodiment, the shelf guard 20 is attached to a support structure 40 through two movements. First, the shelf guard 20 is positioned next to the shelf 40 and is moved horizontally towards it (as shown by the horizontal arrow extending outwardly and to the right from 23 in FIG. 1) so that a vertical edge surface 42 of shelf 40 makes direct contact with the protective surface 23 (as shown in FIG. 2). After this is complete, the shelf guard 20 is moved upwards (as shown by the vertical arrow extending upwardly from 30 in FIG. 1) until the inner facing adhesive surface of the adhesive of the attachment element 30 makes direct contact with a lower horizontal edge surface 44 of the shelf 40 (as shown in FIG. 2). Extra pressure should be applied upwardly during this procedure to ensure that the adhesive securely bonds to the lower horizontal edge surface 44 of the shelf 40.

Once attached, the shelf guard 20 creates an upwardly extending protective wall along the edge of shelf 40 that prevents any objects 50 on the shelf 40 from falling off the edge of shelf 40 as previously described. The shelf guard 20 may be manufactured in any number of sizes, shapes, designs, colors and may optionally include printed indicia. The shelf guard 20 may be attached to any existing shelves regardless of size, shape and type (different shelves may require differently sized and shaped embodiments of the present invention). The shelf guard 20 is preferably constructed from a strong, substantially rigid and transparent material such as plastic (as shown by section lines) or acrylic. The shelf guard 20 may alternatively be created from a translucent material or a completely-non-transparent material (e.g. wood) or even from a non-rigid material, based on customer needs. It is fully anticipated within the spirit and scope of the present invention that any of a large variety of materials may be suitable for construction of a shelf guard 20 based on any number of considerations such as customer preferences, material costs, aesthetics, resistance to sunlight or humidity etc.

In the several embodiments illustrated in the several views of the drawings, the protective member 22 and mounting member 24 are molded together as a single piece. However, in alternate embodiments, it is fully expected that shelf guards may also be made as combinations of separate, connectable protective and mounting members. The methods by which separate protective and mounting members may connect is fully expected to include any well-known methods of connecting two objects, such as using an adhesive, a rod swivel or a spherical swivel.

It is also noted that while in the several embodiments illustrated in the several views of the drawings, a shelf guard 20 is comprised of a protective member 22 and a mounting member 24 made from the same material (i.e. plastic), there is no restriction described or taught herein specifically limiting the material of the protective member 22 to be identical to the material of the mounting member 24. For instance, a shelf guard 20 could comprise a glass protective member 22 and a wooden mounting member 24. The materials used for each member may potentially face a different set of criteria and it may therefore be found most optimal to choose a shelf guard 20 made from a plurality of materials instead of only a single material. It is further noted that in the cases of shelf guards 20 comprising multiple protective members 22, it is fully anticipated that one or more protective members may be made from a different material than one or more other protective members. This principle additionally applies to cases of having one or more mounting members 24. Accordingly, a shelf guard 20 may be required to have a steel protective member, a glass protective member, a wooden mounting member and a plastic mounting member. Such a combination and any and all other similar combinations are fully contemplated within the spirit and scope of the present invention.

In the several embodiments illustrated in the several views of the drawings, the protective member 22 and mounting member 24 are shown as rectangular-shaped members. However, in alternate embodiments, it is fully expected that shelf guards may also be made from protective and/or mounting members of other various shapes, sizes or designs. Additionally, the size, shape, design, or any other features of the protective member 22 do not necessarily need to match those of the mounting member 24. For example, it may be desired to have a small, circular mounting member connected to a very large, triangular protective member. Moreover, in embodiments of shelf guards comprising multiple protective members and/or multiple mounting members (such as the embodiment shown in FIG. 5), the size, shape, design or any other features of one particular protective member does not need to be identical to the size, shape, design or any other features of one or more other protective members (this principle applies identically the case of having multiple mounting members). Therefore, an embodiment in which a shelf guard comprises a large triangular protective member, a small square protective member, a large circular mounting member and a small hexagonal mounting member would be fully possible and anticipated under the present invention. Due to the large variation in customer needs and desires, as well as material costs and properties, these and other similar varieties of combinations of sizes, shapes, designs and other features are fully expected within the spirit and scope of the present invention.

In the several embodiments of the several views of the drawings, the mounting member 24 of the shelf guard 20 rests against the shelf's 40 lower horizontal edge surface 44. This configuration has been illustrated only as means of an example, and it should not be considered in any way as a limiting factor on where it is intended that the mounting member 24 may be located in relation to the shelf 40 or the protective member 22. For example, it is entirely possible for a mounting member to be located instead on the upper horizontal surface of a shelf 40 (i.e. adjacent to the objects 50) or even at an increased distance from the shelf 40 and the protective member 22. As a second example, a mounting member 24 could adhere to a wall surface beneath a shelf 40 and connect to the protective member 22 through a longer distance means (e.g. a long, metal rod). As such, it is not necessary for the mounting member to be directly adjacent to the protective member or to the shelf being protected; instead, it is only one of the many possibilities envisioned within the spirit and scope of the present invention.

Figure 5:
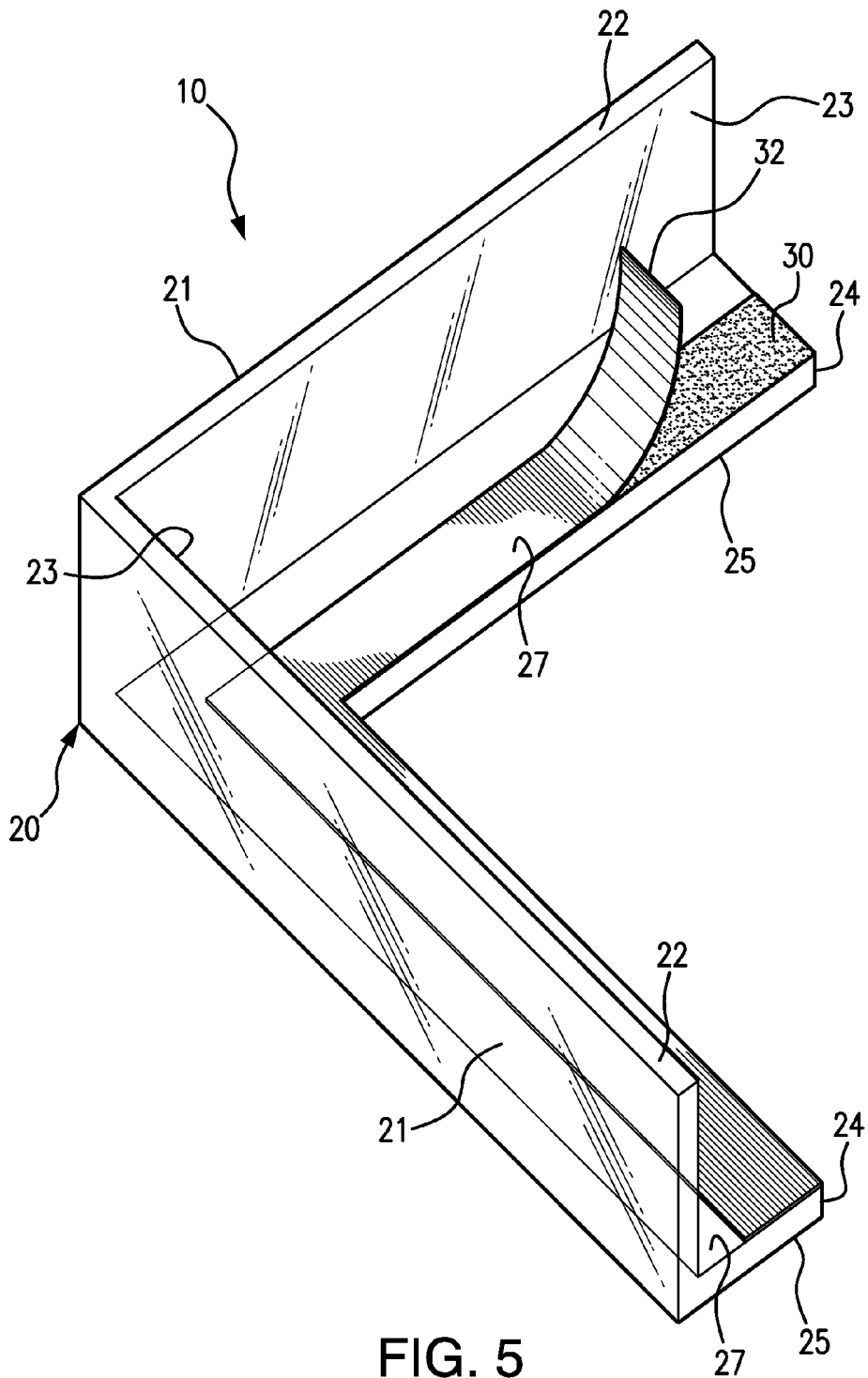
FIG. 5 is a schematic front perspective view of a further embodiment of the shelf guard of the present invention and wherein the shelf guard has two protective members and two mounting members adapted to be secured to an edge of a corner of a support structure, and wherein an adhesive is shown having a peelable protective film as previously depicted in FIG. 4.

Alternate embodiments of the present invention include shelf-guards for vertical edges of various angles (e.g. tables with a 90-degree edge, shelves with a 180 degree edge, other surfaces with any angle between 0- and 180-degrees) and horizontal edges of various angles (e.g. a straight shelf being 180-degrees, or a 90-degree edge of a countertop, or any other horizontal edge having an angle between 0- and 180-degrees). For instance, while FIGS. 1-4 illustrate a single edge shelf guard 20, FIG. 5 shows how shelf guards 20 can be fitted to multiple edges simultaneously, such as on the corner of a table or shelf, by having two protective members 22 (shown perpendicular to each other) and at least one mounting member 24 (two are shown in FIG. 5) for attaching the shelf guard 20 to the table or shelf. It is also noted that the number of protective members 22 and the number of mounting members 24 do not necessarily need to be the same. For instance, a shelf guard could comprise three connected protective members 22 (to protect three edges of one or more surfaces) with only one mounting member 24 (connected to only one of the three protective members) to secure the shelf guard to the edge surface. Any and all varieties of numbers of protective and mounting members (provided that there is at least one of each), are fully intended within the spirit and scope of the present invention. Additionally, there are no limitations placed on the specific attachment element 30, because many adequate attachment elements exist, such as double-sided tape, threaded screws, adhesive pads, adhesive strips, etc. and it is fully intended that the shelf guard 20 is fully compatible and may be fitted with any and all of such types of attachment elements.

Throughout the detailed description and the accompanying several views of the drawings enclosed herein, a plurality of embodiments have been shown, described and detailed, wherein a variety of possible features may be formed and configured in different ways, such as the ability for shelf guards to be made of non-transparent materials (as opposed to transparent materials) and the ability for shelf guards to have a different number of differently sized and shaped protective and mounting members. Accordingly, it is herein acknowledged that any and all possible combinations of these various embodiments, such as using a shelf guard with a wooden triangular protective member and a rectangular rubber protective member with a plastic circular mounting member, may be desirable to manufacturers and/or may help to more successfully meet customers' specific needs. Consequently, it is herein maintained that any and all possible combinations of the features mentioned herein are fully considered within the spirit and scope of the present invention.

While the present invention 10 has been shown and described in accordance with several preferred and practical embodiments thereof, it is recognized that departures from the instant disclosure are fully contemplated within the spirit and scope of the present invention.

What is claimed is:

1. A barrier device for supporting objects comprising:
 a shelf member having a flat top surface defining a support surface for supporting the objects thereon, a bottom flat surface parallel to said top surface, and a front vertical edge extending between the top and bottom flat surfaces;
 a unitary, one-piece shelf guard including:
  a protective member having an inner facing protective surface and an opposite outer facing surface;
  a mounting member having an upwardly facing flat mounting surface and an opposite downwardly facing surface;
  said protective member being integrally formed with said mounting member as a unitary one-piece body with said protective member extending upwardly and perpendicular to said mounting member; and
 an adhesive on said mounting surface and spaced from said inner facing protective surface of said protective member, said adhesive being structured and positioned for fixedly attaching said mounting surface of said mounting member in mating, attached engagement with said bottom flat surface of said shelf member so that said inner facing protective surface engages said front vertical edge of said shelf member with no gap between said inner facing protective surface and said front vertical edge, and said inner facing protective surface extending upwardly from said front vertical edge and said shelf member in perpendicular relation to said support surface.

2. The barrier device as recited in claim 1 wherein at least said protective member of said shelf guard is transparent.

3. The barrier device as recited in claim 2 wherein said shelf guard is formed of a transparent material.

* * * * *